May 23, 1950 W. J. LITWIN 2,508,956
ELECTRICAL PROBE SWITCH
Filed Oct. 18, 1946 2 Sheets-Sheet 1
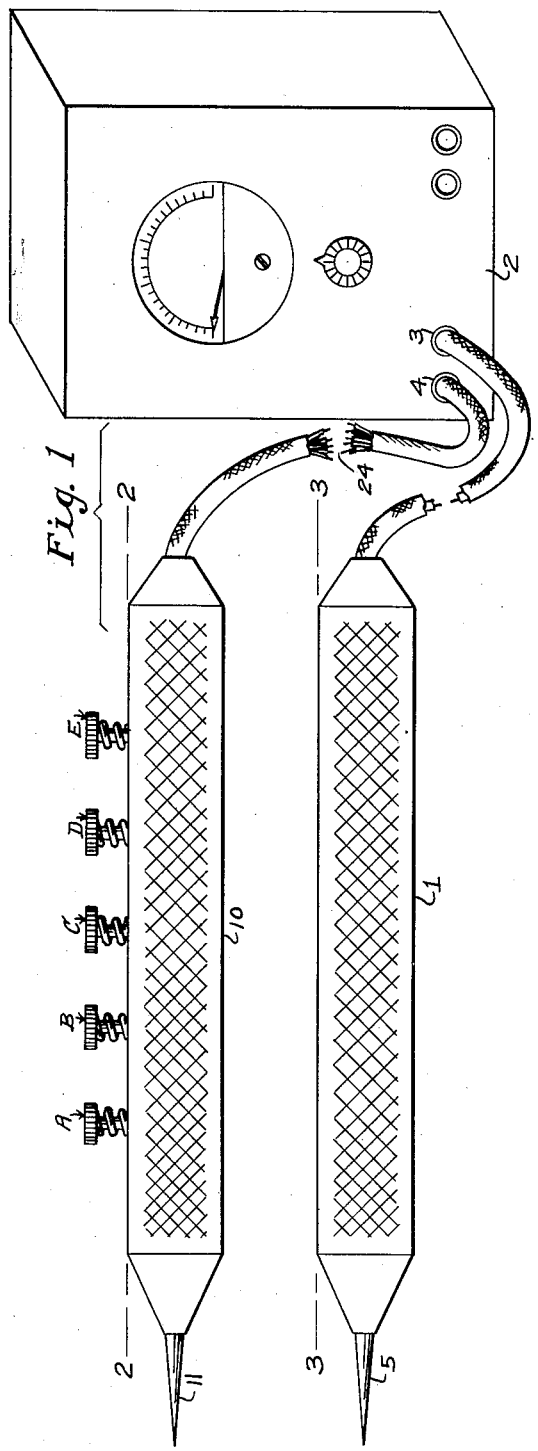
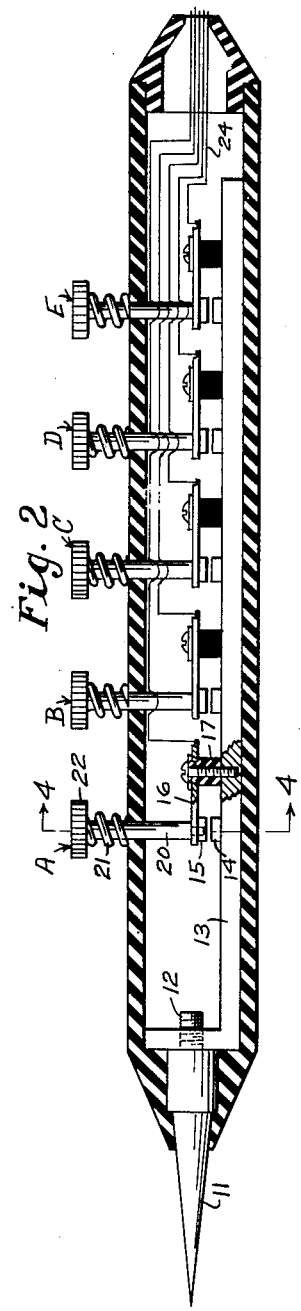
INVENTOR.
William John Litwin
BY Victor J. Evans & Co.
ATTORNEYS May 23, 1950 W. J. LITWIN 2,508,956
ELECTRICAL PROBE SWITCH
Filed Oct. 18, 1946 2 Sheets-Sheet 2
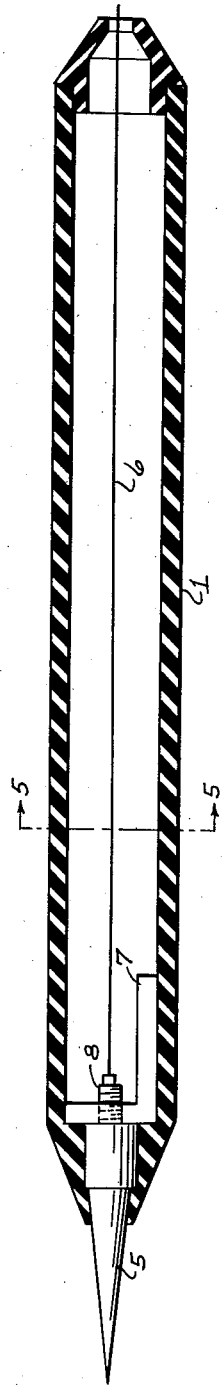
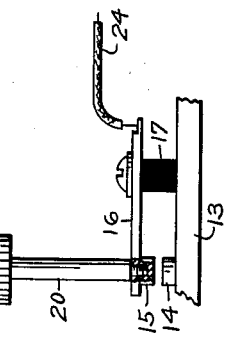
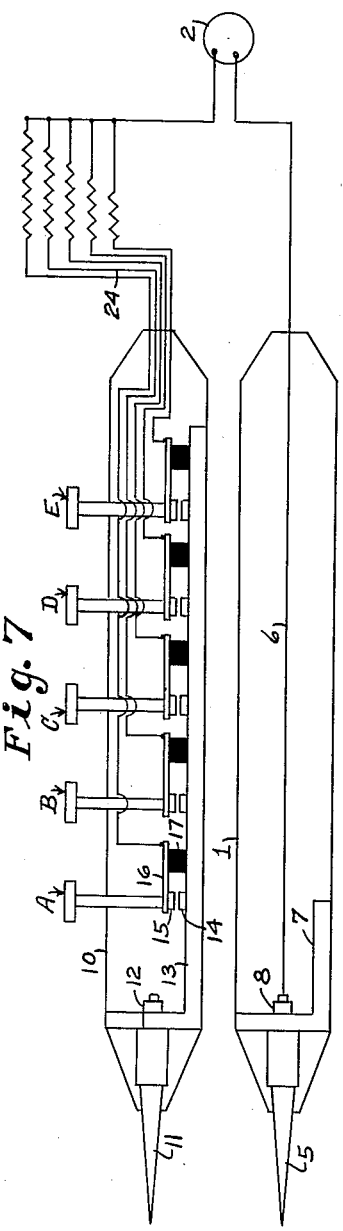
INVENTOR.
William John Litwin
BY Victor J. Evans & Co.
ATTORNEYS Patented May 23, 1950

2,508,956

UNITED STATES PATENT OFFICE 2,508,956

ELECTRICAL PROBE SWITCH

William J. Litwin, Glastonbury, Conn.

Application October 18, 1946, Serial No. 703,987

1 Claim. (Cl. 200—51.05)

This invention relates to improvements in electrical measuring devices, and more particularly to the provision of a device including a selector switch which is especially adapted for making measurements in radio apparatus.

It is an object of the invention to provide an electrical measuring device which includes sharp pointed probes which enable the measuring of voltages, current, and resistance in places normally inaccessible to the usual measuring instruments.

A further object is the provision of an electrical measuring instrument which by finger control can be made to cover a considerable number of ranges of voltage, current and the like.

A further object is the provision of an electrical measuring device, including sharp pointed probes, which can conveniently be used with standard electrical measuring instruments.

These and other objects are attained by the novel arrangement and construction of parts hereinafter described and illustrated by the accompanying drawings, forming a part hereof, and in which:

Fig. 1 is a view showing probes connected to a standard type of electrical measuring meter.

Fig. 2 is a sectional view taken on the line 2—2 of Fig. 1.

Fig. 3 is a sectional view taken on the line 3—3 of Fig. 1.

Fig. 4 is a sectional view taken on the line 4—4 of Fig. 2.

Fig. 5 is a sectional view taken on the line 5—5 of Fig. 3.

Fig. 6 is a view of a terminal as indicated by the arrow 6 in Fig. 2.

Fig. 7 is a schematic wiring diagram of the device.

Referring to the drawings, the electrical measuring device is shown to comprise two probes 1 and 10, which have handle portions made of a plastic material, the handle portions being of square cross-section, preferably, with knurled outer surfaces.

Probe 1 has a single wire 6 which is connected to terminal 3 of an electrical meter 2. Probe 10 has a plurality of wires adapted to be connected to terminals in the meter through a socket 4 of the meter. Probe 1 has a sharp pointed tip 5, which is connected to wire 6 by means of a threaded stud 8 and an angle metal member 7. The handle of each probe is open at one end, and closed by means of a plastic plug 9 (see Fig. 3) through which the wires pass.

Probe 10 has a sharp pointed tip 11 which is connected by a threaded stud 12 to a metal bar 13 which extends the length of the handle. Attached to the bar 13 at spaced intervals are metal contacts 14 adapted to engage contacts 15 connected to metal plates or arms 16 which are supported by bushings 17 of non-conductive material, the bushings 17 being secured to the bar 13 by screws 18 and insulated from the arms 16 by washers 19 of insulating material.

Screwed into the arm 16 which carries the contact 15 is a stem 20 which is inserted firmly into a plastic cap or bottom 22, there being interposed between the cap 22 and the handle a spring 21 to normally hold the cap in a raised position to prevent engagement of contacts 14 and 15. Of course, the handle is provided with a plurality of holes to accommodate the stems 20. Attached to the arms 16 are lugs 23 to which are attached wires 24, the several wires leading through a socket 4 and connected to terminals in the meter 2.

In the drawings, Fig. 2, are shown 5 sets of contacts, A, B, C, D, E, which enable the measuring of voltages in five different ranges, the different ranges being obtained by the battery of resistances 25 or rheostat of the usual electrical tester or meter, the units of which are respectively connected to the sets of contacts by the wires 24. The first set of contacts nearest the tip 11 is used for high voltages, while contact set E is used for low voltages. In the diagrammatic view shown in Figure 7 the resistances 25 are illustrated as separate from the meter, whereas in practice these resistance coils are incorporated in the meter.

In operation, the operator inserts the tips 5 and 11 at the points where the potential drop is to be measured. One of the caps 22, depending upon the range of the voltage, is depressed to make contact between 14 and 15, and a connection is thus made to the meter 2, which will register the voltage in the proper range, in a manner well known in voltage multiplying devices.

It will be seen that the probes can be easily and conveniently handled in situations normally inaccessible to the usual electrical measuring devices. The caps 22 can be readily depressed with the fingers, enabling quick measurements. The device is obviously of considerable value in the testing of radio apparatus and the like, where the disassembling of parts is not practical.

The above description is to be considered as illustrative and not limitative of the invention of which modifications can be made without departing from the spirit and scope of the invention as set forth in the appended claim.

The invention having been described, what is claimed is:

A probe for electrical testing instruments comprising an elongated substantially hollow insulated body having tapering ends, a metallic point extended from one end of the body, an L-shaped contact bar extended substantially throughout the length of the body, positioned in the body and connected to the point, a plurality of contact arms positioned parallel to the bar extended throughout the length of the body, insulated bushings mounted in the ends of the arms and extended therefrom, screws extended through the bushings and threaded in the bar for mounting the arms on the bar, pairs of coacting contact points on the bar and arms, a plurality of buttons extended from the outer surface of the body and having stems extended into the body with the stems positioned to engage the arms to close the contact points, means resiliently urging the buttons outwardly, and a conduit extended from the end of the body opposite to the end carrying the point having a plurality of wires therein with each wire connected to one of the said contact arms.

WILLIAM J. LITWIN.

REFERENCES CITED

The following references are of record in the file of this patent:

UNITED STATES PATENTS

| Number | Name | Date |
| --- | --- | --- |
| 517,402 | Allen | Mar. 27, 1894 |
| 1,107,013 | Anderson | Aug. 11, 1914 |
| 1,629,467 | Archila | May 24, 1927 |
| 1,707,051 | Colosoff | Mar. 26, 1929 |
| 1,970,232 | Hady | Aug. 14, 1934 |
| 2,026,303 | Curran | Dec. 31, 1935 |
| 2,418,872 | Fisher | Apr. 15, 1947 |